(12) United States Patent
Randazzo et al.

(10) Patent No.: US 6,904,364 B2
(45) Date of Patent: Jun. 7, 2005

(54) NAVCELL PIER TO PIER GPS

(75) Inventors: William S. Randazzo, 10 Maple Pkwy., Sparta, NJ (US) 07871; Jonathan M. Rose, Sussex, NJ (US); Richard A. Randazzo, Poland, NY (US)

(73) Assignee: William S. Randazzo, Sparta, NJ (US)

( * ) Notice: Subject to any disclaimer, the term of this patent is extended or adjusted under 35 U.S.C. 154(b) by 0 days.

(21) Appl. No.: 10/405,273

(22) Filed: Apr. 2, 2003

(65) Prior Publication Data

US 2004/0015293 A1 Jan. 22, 2004

Related U.S. Application Data

(60) Provisional application No. 60/319,769, filed on Dec. 11, 2002, and provisional application No. 60/319,162, filed on Apr. 2, 2002.

(51) Int. Cl.[7] .......................... G06F 17/60; G06F 15/16; B63H 21/22
(52) U.S. Cl. ...................... 701/213; 370/235; 370/338; 370/480; 342/357.02
(58) Field of Search ................................ 701/207, 209, 701/213, 214, 215, 208, 200, 202; 340/995.19, 995.2, 990, 995.17; 455/404.2, 41.2, 41, 426.2, 422.1, 445, 456.1, 427; 370/338, 431, 480, 235; 342/357.02, 357.03, 357.07, 357.09, 357.1; 440/1; 705/14; 709/219; 398/58; 345/764, 855

(56) References Cited

U.S. PATENT DOCUMENTS

| 5,153,836 A | * | 10/1992 | Fraughton et al. | 342/455 |
| 5,307,074 A | * | 4/1994 | Janex | 342/41 |
| 5,381,338 A | * | 1/1995 | Wysocki et al. | 348/116 |
| 6,041,222 A | | 3/2000 | Horton et al. | 455/255 |
| 6,204,808 B1 | | 3/2001 | Bloebaum et al. | 342/357.07 |
| 6,246,376 B1 | | 6/2001 | Bork et al. | 343/760 |
| 6,263,281 B1 | * | 7/2001 | Yamamoto et al. | 701/215 |
| 6,292,747 B1 | * | 9/2001 | Amro et al. | 701/213 |
| 6,295,023 B1 | | 9/2001 | Bloebaum | 342/357.06 |

(Continued)

FOREIGN PATENT DOCUMENTS

WO        2003/085414 A3     10/2003

*Primary Examiner*—Thomas G. Black
*Assistant Examiner*—Tuan C To
(74) *Attorney, Agent, or Firm*—Hoffmann & Baron, LLP

(57) ABSTRACT

The present invention is directed to, a navigation system comprising; a plurality of GPS-receivers having GPS antennas mounted thereto for receiving GPS signals, a data processing apparatus for processing GPS signals and determining location data, a wireless network transmitting and receiving apparatus connected to the data processing apparatus for transmitting and receiving the location data from the plurality of GPS-receivers, and a display device for displaying the location data.

23 Claims, 4 Drawing Sheets

U.S. PATENT DOCUMENTS

| | | |
|---|---|---|
| 6,327,533 B1 | 12/2001 | Chou ........................ 701/207 |
| 6,336,035 B1 | 1/2002 | Samoza et al. ............. 455/446 |
| 6,389,291 B1 | 5/2002 | Pande et al. ................. 455/456 |
| 6,427,120 B1 | 7/2002 | Garin et al. ................. 701/213 |
| 6,453,237 B1 | 9/2002 | Fuchs et al. ................ 701/213 |
| 6,637,915 B2 * | 10/2003 | von Wolske ................ 362/477 |
| 6,658,349 B2 * | 12/2003 | Cline .......................... 701/207 |
| 6,684,157 B2 * | 1/2004 | Barman et al. ............. 701/213 |
| 2001/0018639 A1 | 8/2001 | Bunn ........................ 701/214 |
| 2001/0029427 A1 | 10/2001 | Nagaki et al. ............. 701/208 |
| 2001/0033225 A1 | 10/2001 | Razavi et al. ............. 340/25.5 |
| 2001/0045904 A1 | 11/2001 | Silzer, Jr. ............... 342/357.07 |
| 2001/0045914 A1 | 11/2001 | Bunker ........................ 343/895 |
| 2001/0047240 A1 | 11/2001 | Lee ........................... 701/208 |
| 2001/0051527 A1 | 12/2001 | Kuwahara et al. ........ 455/456.6 |
| 2001/0054066 A1 | 12/2001 | Spitzer ....................... 709/203 |
| 2001/0056327 A1 | 12/2001 | Jin ............................ 701/213 |
| 2002/0002599 A1 | 1/2002 | Arner et al. ................. 709/219 |
| 2002/0003488 A1 | 1/2002 | Levin et al. ................. 342/70 |
| 2002/0010000 A1 | 1/2002 | Chern et al. ................. 455/517 |
| 2002/0010756 A1 | 1/2002 | Oku ........................... 709/213 |
| 2002/0011950 A1 | 1/2002 | Frazier et al. ........ 342/357.08 |
| 2002/0016173 A1 | 2/2002 | Hunzinger ................ 455/456.5 |
| 2002/0016870 A1 | 2/2002 | Hindman ...................... 710/3 |
| 2002/0016881 A1 * | 2/2002 | Hatsumoto .................. 710/305 |
| 2002/0019985 A1 | 2/2002 | Fuccello et al. ............. 725/133 |
| 2002/0022489 A1 | 2/2002 | Odashima et al. ........ 455/456.1 |
| 2002/0022925 A1 * | 2/2002 | Okada ........................ 701/207 |
| 2002/0040271 A1 * | 4/2002 | Park et al. ................... 701/209 |
| 2002/0055872 A1 * | 5/2002 | LaBrie et al. ................. 705/14 |
| 2003/0013425 A1 * | 1/2003 | Nee ........................... 455/186.1 |
| 2003/0040903 A1 * | 2/2003 | Gerson ...................... 704/211 |
| 2003/0132862 A1 * | 7/2003 | Kurosawa ................ 340/995.1 |

* cited by examiner

\* = or equivalent Store and Forward Mesh Protocol

IP Protocol

NAVCELL PIER TO PIER GPS

CROSS REFERENCE TO RELATED APPLICATION

This application claims the benefit of priority on U.S. Provisional Application No. 60/319,162 Filed Apr. 2, 2002, entitled NAV-CELL PIER TO PIER GPS and U.S. Provisional Application No. 60/319,769 Filed Dec. 11, 2002 entitled MARINE GPScell.

FIELD OF THE INVENTION

This invention relates in general to marine navigation systems and more particularly to marine navigation systems having the capability of wireless mesh networking, with each other and with other private and public access points, for the purpose of navigation, collision avoidance, and communication.

BACKGROUND OF THE INVENTION

Due to the lack of fixed landmarks and pathways marine navigation, positioning and hazard avoidance has historically been a problem of great importance. Throughout history, may devices and methods have been utilized to provide a mariner with accurate information concerning his location as well as the location of moving and stationary surroundings. Historically, mariners have used a variety of methods for navigation, including visual observation of known landmarks (referred to as piloting), dead reckoning and celestial observation. Modern developments made electronic navigation possible as well. In electronic navigation, a ship's position is determined with the aid of devices such as radar. These instruments variously make use of the directional properties of radio waves or differences in the times of arrival of radio signals sent simultaneously from different locations or occasionally of the difference in speed between radio waves and sound waves. Today, electronic devices such as radar are widely used in navigation. Most recently, a satellite based system designed, financed, deployed and operated by the U.S. Department of Defense, called Global Positioning System, has been providing continuous worldwide coverage adequate for determining latitude and longitude to within about 30 feet (10 meters), and in many places altitude with the same accuracy. The service is available all over the globe 24 hours a day and free of any charge. The use of the Global Positioning System (GPS) coupled with computer technology, provides a user with positions relative to fixed locations, such as roads on land or the coastline on water to be displayed on an electronic map with a high degree of accuracy. However, even with the use of modem GPS based systems, a mariner still must rely on visual contact or radar to know the position of his vessel relative to other vessels or other moving objects on the water.

It would therefore be desirable to have a GPS based system that can provide a plurality of users with precise positional data regarding their own vessel as well as other similarly equipped vessels as well as providing navigational data for finding a course from one location to another.

SUMMARY OF THE INVENTION

The object of this invention is to provide a GPS-based navigation system for determining the location of a vessel with a high degree of accuracy coupled with a wireless communication system for determining a vessel's position in relation to other vessels and transmitting and receiving data concerning vessel positions to a plurality of similarly equipped vessels in order to enhance navigation safety and overcome the deficiencies in the prior art designs.

The navigation system of the present invention includes a GPS system, together with a wireless network communications system. The navigation system according to the present invention is deployed on a plurality of vessel located on a body of water. The navigation system of each vessel is linked by way of a wireless mesh network, which communicates the position of all vessels to one another. In typical GPS applications, each user is informed of their own position but does not know the coordinates of other nearby users. The wireless mesh network of the present invention makes it possible to relay GPS positional data between users. The system of the present invention equips each user with a monitor for displaying the user's position on the water in both GPS coordinates as well as in a visual representation on a map displayed on the monitor. In addition, each user is also able to view the GPS coordinates and mapped position of all other users on his monitor. In this way, the users can know with a high degree of precision his location with respect to users of the system of the present invention.

The wireless communication system includes a wireless transmitter and receiver coupled with a computer based system for arranging transmitted and received data in accordance with a particular communication protocol. Wireless mesh networks are well known. Local area networks (LANs) provide communications among computers connected to the same network, either directly or indirectly (via bridges and routers). In order for computers to communicate, they must utilize the same standard or communications protocol. One of the most common of such networks is based on the Ethernet standard, developed by the IEEE 802 group. On-going efforts are focused on developing and standardizing wireless Local Area Networks (WLAN), specifically based on the IEEE 802.11 standard.

There is thus provided, in accordance with the present invention, a navigation system comprising; a plurality of GPS-receivers having GPS antennas mounted thereto for receiving GPS signals, a data processing apparatus for processing GPS signals and determining location data, a wireless network transmitting and receiving apparatus connected to the data processing apparatus for transmitting and receiving the location data from the plurality of GPS-receivers, and a display device for displaying the location data.

DETAILED DESCRIPTION OF THE PREFERRED EMBODIMENT

Figure 1:
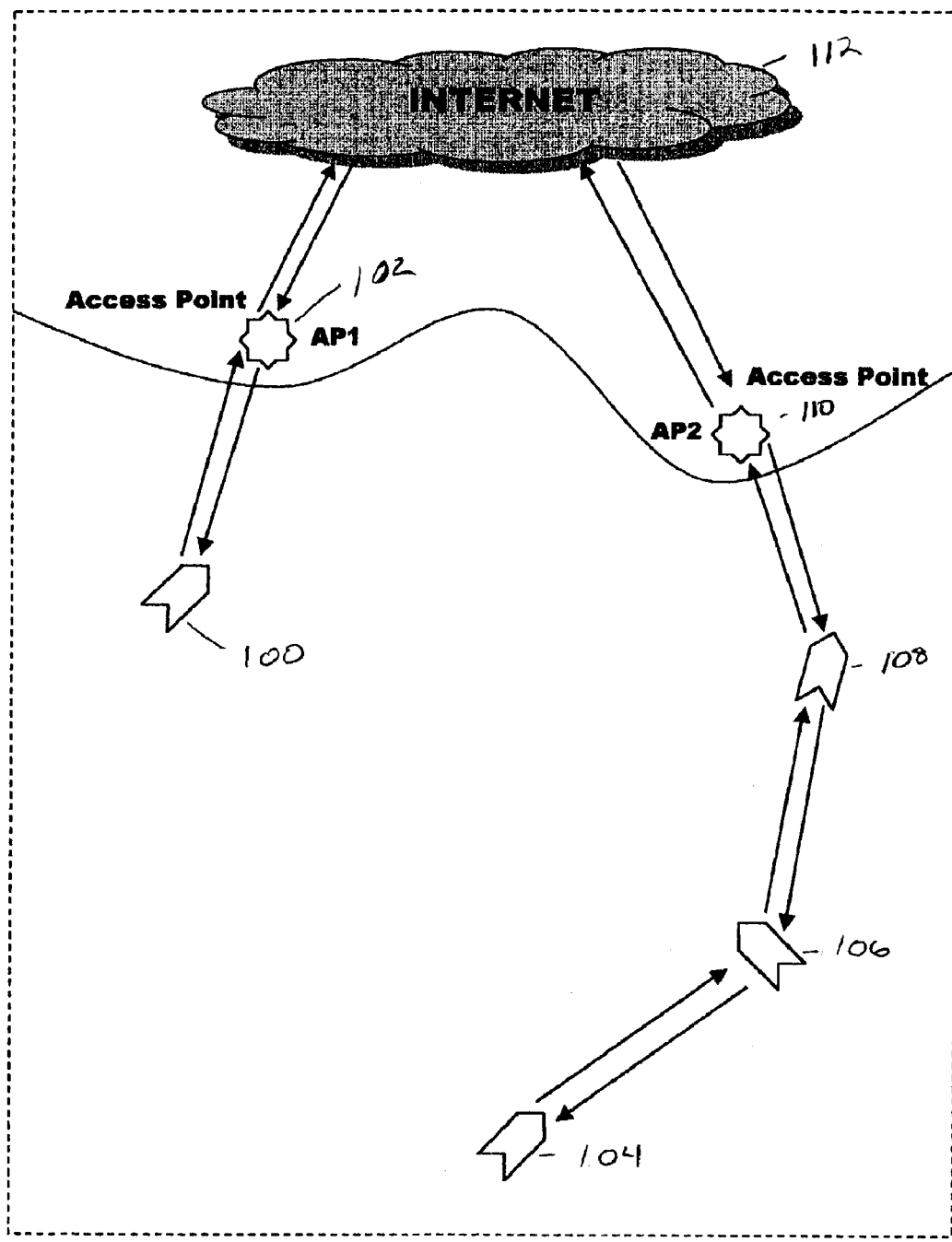
FIG. 1 is a block diagram of an exemplary operating profile in accordance with the present invention.

There will be detailed below the preferred embodiments of the present invention with reference to the accompanying drawings. Like members are designated by like reference characters in all figures.

FIG. 1 depicts an exemplary operating profile according to the present invention. The present invention includes a plurality of navigation systems wherein each navigation system includes a GPS system, together with a wireless network communications system. In this exemplary embodiment, the GPS data is formatted in the National Marine Electronics Association (NMEA) format, however it will be understood that other formats may be used for alternate embodiments of the present invention. The navigation system according to the present invention is deployed on a plurality of vessel located on a body of water such a lake, river, or ocean. The navigation system of each vessel is linked by way of a wireless mesh network, which communicates the position of all vessels to one another. In typical GPS applications, each user is informed of his own position but does not know the coordinates of other nearby users. The wireless mesh network of the present invention makes it possible to relay GPS positional data between users. The system of the present invention equips each user with a monitor for displaying the user's position on the water in both GPS coordinates as well as in a visual representation on a map displayed on the monitor. In addition, each user is also able to view the GPS coordinates and mapped position of all other users on his display monitor. In this way, the user can know with a high degree of precision his location with respect to the shore as well as to other mobile users of the system of the present invention. In addition to communicating with other mobile navigation systems, each mobile system can communicate via the wireless network with stationary shore bound access points. The mobile navigation systems will be able to network to shore access points onto other mobile users of the system of the present invention either directly or indirectly by hopping in serial fashion through other navigation systems of the present invention. An access point provides a gateway for a wireless network device to access the Internet. Both public and private access points exist to provide Internet access to wireless users. In accordance with the present invention, linking to a shore access point will provide a plurality of users to that are outside of the normal operating range of the wireless network to be in communication contact via the internet. In the embodiment depicted, navigation system user 100 is in wireless contact with access point 102, however is outside operational range of navigation system users 104, 106 and 108. However, navigation system users 104, 106 and 108 are in wireless contact with access point 110. Thus via the Internet 112 data from users 100, 104, 106 and 108 can be transmitted from and to each user. Each user is therefore informed of the location of the other users even when outside of wireless radio transmission range, by transmitting positional data across the Internet via access points.

The wireless communication system includes a wireless transmitter and receiver coupled with a computer based system for arranging transmitted and received data in accordance with a particular communication protocol. Wireless local area mesh networks are well known. Local area networks (LANs) provide communications among computer connected to the same network, either directly or indirectly (via bridges and routers). In order for different computers to communicate, they must utilize the same standard or communications protocol. One of the most common of such networks is based on the Ethernet standard, developed by the IEEE 802 group. On-going efforts are focused on developing wireless Local Area Networks (WLAN), specifically based on the IEEE 802.11 standard.

Figure 2:
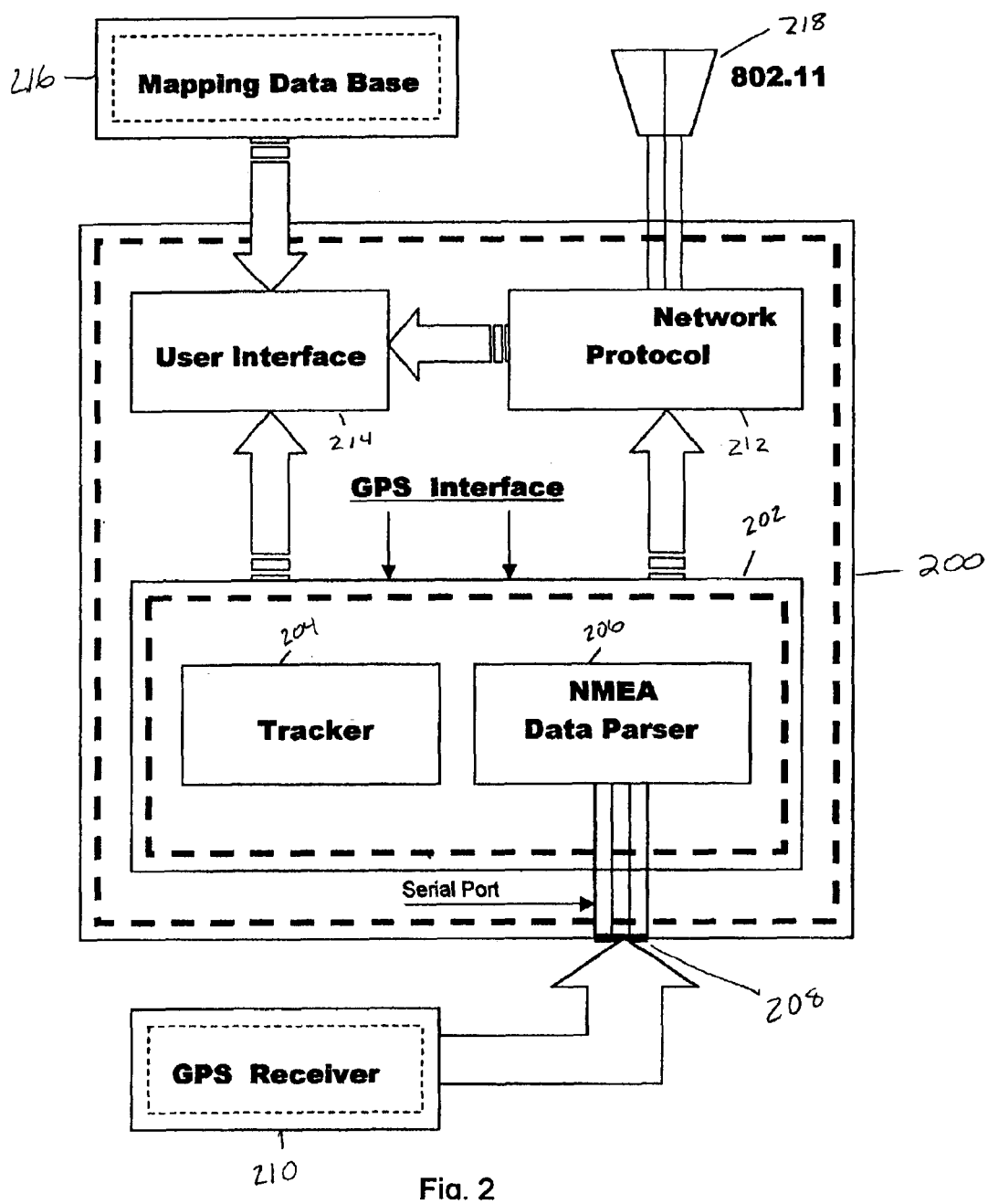
FIG. 2 is a block diagram of an exemplary navigation computer according to the present invention.

FIG. 2 is a block diagram depicting an exemplary embodiment of the system according to the present invention.

The navigation system 200 includes a GPS interface 202 having a tracker portion 204 and a NMEA Data Parser portion 206. The GPS interface in a preferred embodiment also includes a serial port for interfacing with a GPS receiver. The GPS receiver 210 includes the circuitry needed to accept the GPS signals received by a GPS antenna and determine the user's latitude, longitude and altitude. The GPS board is operatively coupled to a GPS antenna for receiving signals from GPS satellites and includes a GPS transceiver, a GPS receiver part, a GPS position measuring computation/control part. The antenna is provided for reception of electromagnetic wave from a GPS satellite. The GPS receiver part performs reception control of GPS data from the GPS satellite. The GPS position measuring computation/control part performs position calculation based on the GPS data. In an alternate embodiment, the GPS receiver can be implemented as an imbedded component of the navigation system. The NMEA data parser accepts the data from the GPS receiver in NMEA format and separates the marine positional data into the appropriate format for transmission to the user interface and the wireless mesh network transceiver 212.

The tracker 204 maintains a record of past positions for users of the navigation system of the present invention. The record can include latitude, longitude, altitude and velocity information. The tracker 204 can maintain a record of past positions for a predetermined time, based on the size of the memory provided. This feature enables a user to retrace or reconstruct an earlier route or simply keep track of routes traversed by the users of the navigation system of the present invention.

In an exemplary embodiment, the user interface 214 displays location information from the GPS portion on a video display terminal; in the preferred embodiment, an LCD touch screen is utilized. The touch screen monitor will display location coordinates of the user's vessel. In addition, a user can view a map showing his current location as well as the location of similarly equipped vessels. The user interface monitor can further include a variety of feature for the alphanumeric or graphical display of positional information that are well known in the art. For exemplary purposes these can include display of interactive map showing the users position as well as the position of other vessels or navigation data showing a course to a particular destination.

The navigation system 200 further includes a wireless mesh networking portion 212 for enabling communication of data with a plurality of navigation systems of the present invention. Preferably the network system utilized will be a packet switched network employing the standard 802.11 Ethernet Standard with peer to peer mesh networking although the use of other wireless networking standards may be implemented. In an exemplary embodiment, access points will be on shore points and on other stationary or near stationary water borne vessels. The typical radio frequency specification is in the 2.4 GHz range, and operates within an approximate 5-mile range. In addition, in an alternate embodiment, a standard 802.11a wireless network is used to also provide wireless communication with a hand-held remote device according to the present invention for providing the user with remote access to navigation data separate from the main navigation system monitor. In this way a user is free to move about his vessel while still being able to receive navigation data. The operational range of the 802.11a remote system is approximately 100 ft. The main system of the present invention is networked via the 802.11b protocol to a plurality of other main systems located on other vessels. As previously stated in this exemplary embodiment, the operational range is approximately 5 miles, however the use of a serially-hopping mesh network will significantly increase operating range. In this exemplary embodiment, the wireless network signal is transmitted via omni-directional antennas 218 having a frequency range of 2.4 GHz, with 8 to 12 decibel gain. For greater signal focus and range, an array of panel antennas can also be utilized.

There is further provided a data storage device 216 such as a hard drive for storing operating system software, application programs, and data. Examples of application programs include networking software and mapping software. Data storage will include storage of maps and charts, which can be used to plot a user's location.

The navigation system of the present invention can be in a preferred embodiment be implemented utilizing a standard computer motherboard, as typically known in the art. A motherboard is a large printed circuit board, having a number of secondary card, often referred to as daughter cards each mounted in a slot connector of the mother board. The motherboard is connected to one or more data storage drives, and a common power supply. The motherboard also carries the central processing unit (CPU), BIOS read-only memory, random access memory, and various peripheral integrated circuits which perform data input/output functions for the central processor. Various auxiliary systems are arranged on separate printed circuit boards connected to the motherboard using slot connectors on the motherboard. For example, cards frequently installed in slots on the motherboard include video output systems and communications systems. In a particular embodiment, the navigation system of the present invention can be implemented by incorporating a GPS onto a standard motherboard, preferably as a daughter board to implement the GPS features.

Figure 3:
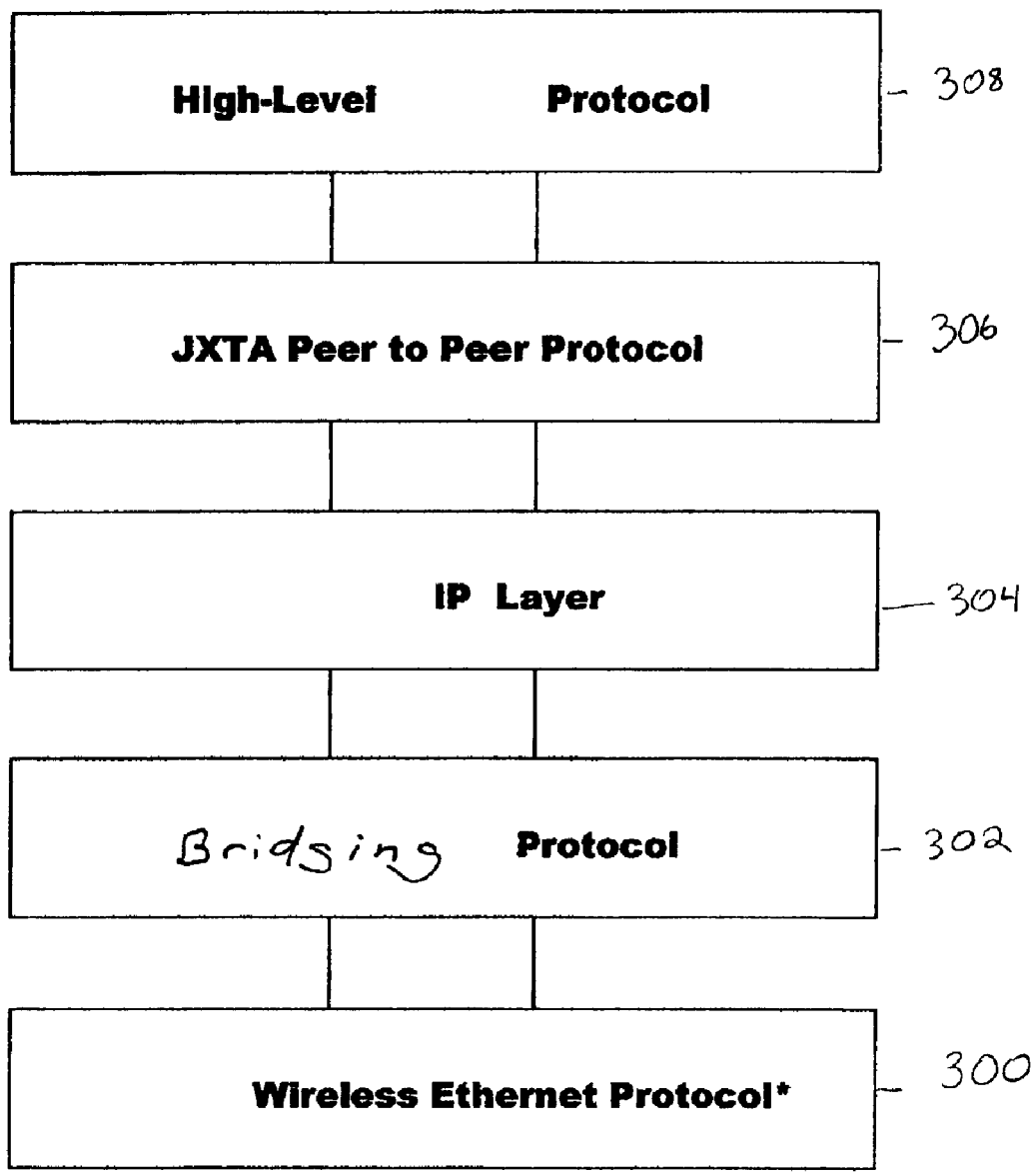
FIG. 3 is a block diagram of an exemplary network protocol-layering model according to the present invention.

Turning now to FIG. 3 there is depicted a block diagram of an exemplary network protocol layering model or protocol stack. The components protocols of the navigation system are connected in various methods, such as the 802.11b wireless network protocol or the Ethernet Standard. To accommodate the various methods, the interconnections are illustrated in a functional sense. Therefore, it is understood that the descriptions of the components and interconnections therebetween are meant for exemplary purposes. The protocol stack is used to support various communications in the navigation system of the present invention including the wireless network. A data device, such as in this case a GPS receiver, is connected to the computer portion of the present invention. The GPS data is received by the computer for conversion into the appropriate format for transmission by a wireless network. That process starts with a connection via the 802.11b wireless network protocol.

The network topology according to the present invention consists of five general sections that ascend from the base 802.11b wireless network protocol 300 to the high level navigation system protocol 308. According to this topology, each layer undertakes the requirements that are needed to implement the present invention. The base layer of the network topology according to the present invention is the 802.11b wireless protocol 300. The adapters that support the 802.11b protocol work in two modes, Ad-Hoc and Infrastructure. The Infrastructure mode uses access points to centralize wireless communication whereas the Ad-Hoc mode allows for direct communication between wireless devices without utilizing an access point. The Ad-Hoc mode allows for the navigation system according to the present invention to act independently and engage in peer-to-peer networking with other navigation systems according to the present invention. The 802.11b protocol provides the basic building blocks for the network of the present invention. The next layer of the protocol stack according to the present invention is an 802.1d Ethernet bridging protocol 302. The present invention will require some means to store-and-forward data between peers. This is an intrinsic requirement for any peer-to-peer protocol to work effectively, more specifically, with respect to the present invention; it enables individual users to communicate directly with other users of the present invention without utilizing an access point. It should be noted that in the preferred embodiment the store-and-forward system utilizes a modified 802.1d Ethernet bridging protocol, however, other store-and-forward systems can be implemented, such as, for example, MobilMesh™ or other mesh networking integration systems known in the art. The next layer of the protocol stack of the present invention is the navigation system IP layer 304. This layer will handle how each cell's IP address is assigned. In addition, this layer will represent the process behind making a cell and entity in the mesh network. The IP scheme involves a gratuitous Address Resolution Protocol (ARP) mechanism in which a cell broadcasts a random IP in the 10.0.0.0/8 range. In the ARP mechanism, if the IP is already taken be another cell, the cell that holds the IP will respond showing that there is a conflict. In this case, the cell will gratuitously ARP again on a new random IP until there is no response after a certain period of time. Eventually, the cell will find an unclaimed IP address and then claim that IP address as its own. This mechanism will assign each cell its own identity in the mesh network to provide for direct communication between the cells. The next layer, JXTA Peer to Peer Protocol 306, involves actual communication between cells. The JXTA is a set of open, generalized peer-to-peer protocols that allow any connected device on a network to communicate and collaborate within its network. This is the underlying mechanism that provides for communication and interaction between cells. JXTA provides protocols for peer resolving, peer discovery, peer information, pipe binding, endpoint routing, and has its own rendezvous protocol. These protocols work together to give generalized peer-to-peer networking between cells on the mesh network according to the present invention. This protocol allows for the exchange of data between cells in a fashion that will allow cells to exchange information that includes GPS location as well as special messages representing general communication.

All of the aforementioned layers are encapsulated by the high level navigation system protocol layer 308. This protocol represents the top level of the mesh network according to the present invention and involves the actual interpretation of data and communication with other cells. The navigation system protocol layer 308 provides each cell with the ability to communicate a wide range of data and information representing distress signals, general communication and simple positional data. Data from the navigation system of the present invention will encapsulate standard fields such as velocity, time and position. Such data can also be extended in alternate embodiments to include any set of fields such as weather, emergency or ship name.

The five-layer protocol stack comprises the networking schema of the navigation system according to the present invention. Each layer permits operability on various levels. The operability provided by the various levels provide for the navigation system of the present invention to work in the individual cell scheme and in the wireless mesh network scheme. It will be obvious to one skilled in the art that the peer-to-peer network described above is not limited to application in the marine environment, but can also be deployed for land and air applications as well as for a global mesh network incorporating all such exemplary applications.

Figure 4:
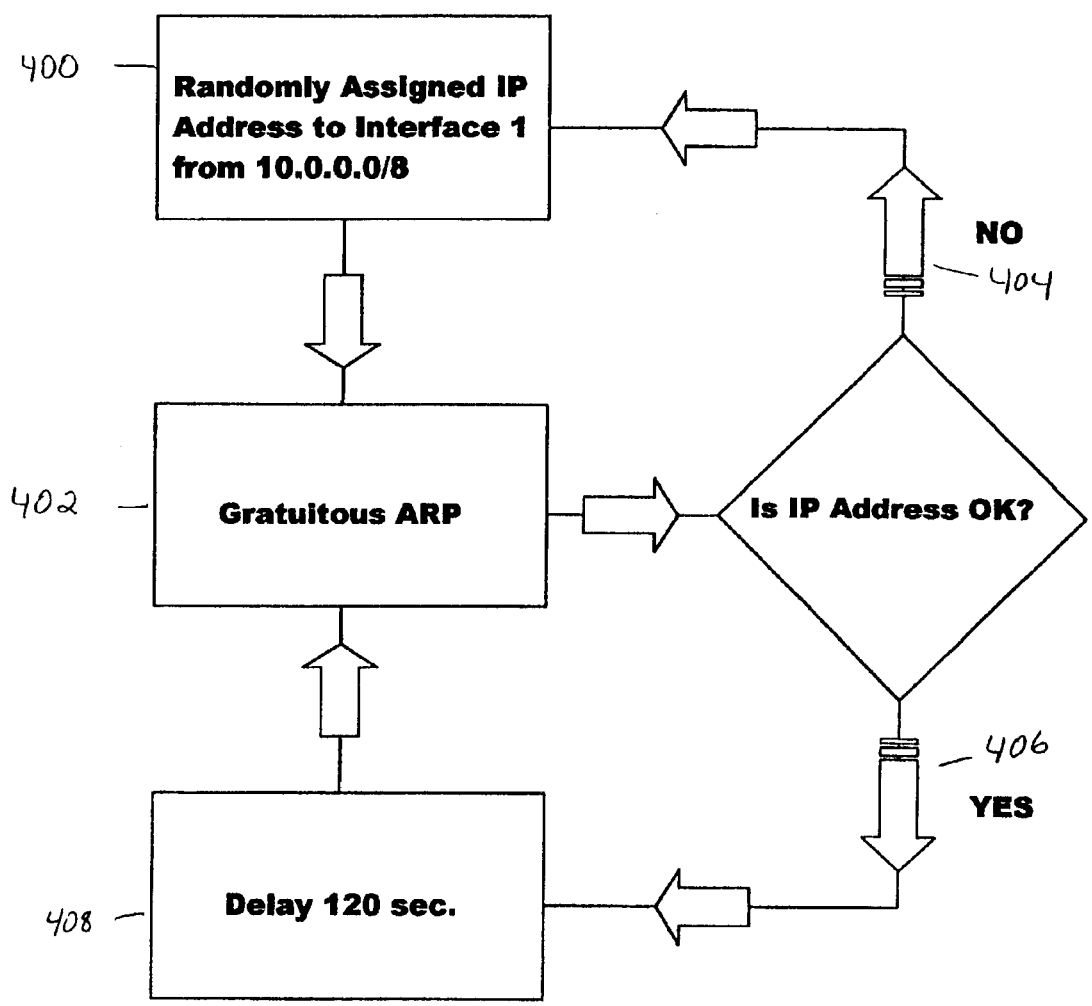
FIG. 4 is a flowchart of the IP protocol in accordance with the present invention.

Turning now to FIG. 4 there is provided a flowchart for the IP layer navigation system protocol according to the current invention. This protocol will be used to optimistically map unique addresses to each system of the present invention and to ensure that any address conflicts that arise are resolved.

A gratuitous ARP is a method of determining whether an IP address conflict has occurred on the local Ethernet segment to which a computer network system is connected. To perform a gratuitous ARP, the system sends out a specially crafted packet requesting the hardware address at any machine associated with its LP address. If a reply is heard, then it is known that another machine has already staked claim to that particular LP address, and a conflict has occurred. If no reply is heard, the local machine knows that it is the only claim holder for that particular IP address.

The process begins by the system of the present invention assigning itself 400 a random IP address from the private IP address range 10.0.0.0/8. A gratuitous ARP 402 is then sent to other units within range to determine if the assigned address is conflicting with their assigned address. If a conflict is found, 404 a new address is reassigned and the gratuitous ARP is retried. If no conflict is found, 406 then the system delays for a specified time and re-issues a gratuitous ARP at the end of the specified time 408 to ensure that no other system with an address conflict has moved into range in the interim period.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments, and/or deviations be included within the scope of the claims appended hereto.

What is claimed is:

1. A navigation system comprising:
   a plurality of GPS-receivers having GPS antennas mounted thereto for receiving GPS signals, wherein said plurality of GPS receivers are located on mobile watercraft,
   a data processing apparatus for processing GPS signals and determining location data,
   a plurality of 802.11 wireless network transmitting and receiving apparatus connected to said data processing apparatus for transmitting and receiving said location data to and from said plurality of GPS-receivers, wherein each of said plurality of 802.11 wireless network transmitting and receiving apparatus are connected to a network for sending and receiving communications between any one of said plurality of 802.11 wireless network transmitting and receiving apparatus and
   a display device for displaying said location data of each of said plurality of GPS-receivers simultaneously in real time with respect to each other in correlation to a graphical format map.

2. The navigation system according to claim 1, wherein said data processing apparatus is a digital computer.

3. The navigation systems according to claim 1, wherein said display device is a video monitor.

4. The navigation system according to claim 3, wherein said video monitor is a touch screen monitor.

5. The navigation system according to claim 1, wherein said location data includes GPS coordinates.

6. The navigation system according to claim 1, wherein said location data is displayed in a graphical format.

7. The navigation system according to claim 6, wherein said graphical format includes a reference map.

8. The navigation system according to claim 1, wherein said wireless mesh network can access the Internet.

9. A navigation system comprising:
   a plurality of devices for determining a location coordinate, wherein said plurality of said devices for determining a location coordinate are located on mobile watercraft,
   a plurality of 802.11 wireless transmitter and receiver for transmitting and receiving said location coordinate from said plurality of devices, wherein each of said plurality of 802.11 wireless transmitters and receivers are connected to a network for sending and receiving communications between any one of said plurality of 802.11 wireless transmitters and receivers, and
   a display devices for displaying said location coordinate for each of said plurality of devices simultaneously in real time with respect to each other in correlation to a graphical format map.

10. The navigation system according to claim 9, wherein said devices for determining a location coordinate is a satellite based system.

11. The navigation system according to claim 10, wherein said display device includes a GPS system.

12. The navigation system according to claim 9, wherein said graphical display.

13. The navigation system according to claim 12, wherein said graphical display includes a reference map.

14. The navigation system according to claim 9, wherein said wireless computer network can access the Internet.

15. A method of navigation comprising;
   providing a plurality of devices for determining a location coordinate on a plurality of watercraft,
   linking said plurality of devices via an 802.11 computer network,
   communicating said location coordinate for each of said plurality of devices via said
   802.11 computer network to each of said plurality of devices,
   displaying said location coordinate at each of said plurality of devices simultaneously in real time, with respect to each other in correlation to a graphical format map.

16. The method of claim 15, wherein the navigation is marine navigation.

17. The method of claim 15, wherein the navigation is on land.

18. The method of claim 15, wherein the navigation is aeronautic.

19. The method of claim 15, wherein said step of providing a plurality of devices includes providing a satellite based device.

20. The method of claim 19, wherein said step of providing a satellite-based device includes providing a global positioning system.

21. The method of claim 15, wherein the step of communicating said location coordinate uses a wireless mesh computer network accessing the Internet.

22. The method of claim 15, wherein the step of displaying said location coordinate includes a graphical display.

23. The method of claim 22, wherein the step of displaying said location coordinate includes a reference map.

* * * * *